United States Patent
Takahashi et al.

(10) Patent No.: US 10,487,732 B2
(45) Date of Patent: Nov. 26, 2019

(54) SYSTEM AND METHOD OF CONTROLLING A TWO-SHAFT GAS TURBINE

(71) Applicant: MITSUBISHI HITACHI POWER SYSTEMS, LTD., Yokohama, Kanagawa (JP)

(72) Inventors: Yasuo Takahashi, Yokohama (JP); Takuya Takeda, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 597 days.

(21) Appl. No.: 14/543,028

(22) Filed: Nov. 17, 2014

(65) Prior Publication Data

US 2015/0135722 A1 May 21, 2015

(30) Foreign Application Priority Data

Nov. 18, 2013 (JP) .................................. 2013-237701

(51) Int. Cl.
*F02C 3/107* (2006.01)
*F02C 9/56* (2006.01)
(Continued)

(52) U.S. Cl.
CPC ............... *F02C 3/107* (2013.01); *F02C 3/10* (2013.01); *F02C 7/1435* (2013.01); *F02C 7/36* (2013.01);
(Continued)

(58) Field of Classification Search
CPC .......... F02C 3/10; F02C 3/107; F02C 7/1437; F02C 7/36; F02C 9/54; F02C 9/56
See application file for complete search history.

(56) References Cited

U.S. PATENT DOCUMENTS 5,140,494 A * 8/1992 Slade ....................... G01B 7/14
324/660
6,012,279 A * 1/2000 Hines .................... F02C 7/1435
60/39.53
(Continued)

FOREIGN PATENT DOCUMENTS

EP       1 548 236 A2    6/2005
EP       1548236 A2 *    6/2005    ........... F01D 13/003
(Continued)

OTHER PUBLICATIONS

Extended European Search Report dated May 18, 2015 (seven (7) pages).
(Continued)

*Primary Examiner* — Todd E Manahan
*Assistant Examiner* — Todd N Jordan
(74) *Attorney, Agent, or Firm* — Crowell & Moring LLP (57) ABSTRACT

A two-shaft gas turbine control system and method are provided that can enhance the efficiency and reliability thereof by controlling the amount of intake air spray and the rotational speed of a high-pressure turbine in accordance with the aperture of an inlet guide vane in a state where a two-shaft gas turbine is being operated with the efficiency of its compressor reduced.

The control system includes a droplet spray device for spraying droplets to intake air for the compressor and a controller. The controller includes a fuel control section for adjusting a flow rate of the fuel to be supplied to the combustor, a spray flow rate control section for adjusting a flow rate of spray water to be supplied to the droplet spray device, an inlet guide vane aperture control section for adjusting the aperture of the inlet guide vane, and an efficiency improvement control section for outputting a command signal for bringing a balance between driving force for the compressor and power output of the high-
(Continued)

pressure turbine to the fuel control section, the spray flow rate control section and the inlet guide aperture control section. In response to the commands from the improvement control section, the controller reduces the rotational speed of the high-pressure turbine and controls the inlet guide vane so as to be more open, thereby appropriately controlling the flow rate of the spray water.

4 Claims, 6 Drawing Sheets

(51) Int. Cl.
    *F02C 9/54*       (2006.01)
    *F02C 7/36*       (2006.01)
    *F02C 3/10*       (2006.01)
    *F02C 7/143*     (2006.01)

(52) U.S. Cl.
    CPC .............. *F02C 9/54* (2013.01); *F02C 9/56* (2013.01); *F05D 2270/023* (2013.01); *F05D 2270/16* (2013.01); *F05D 2270/304* (2013.01)

(56) References Cited

U.S. PATENT DOCUMENTS

| | | | | |
|---|---|---|---|---|
| 6,449,953 B1* | 9/2002 | Hook, Jr. | ............... | F02C 3/30 60/39.53 |
| 6,634,165 B2* | 10/2003 | Tomlinson | ............... | F01D 17/08 60/39.3 |
| 6,679,060 B2* | 1/2004 | Hellat | ............... | F02C 3/305 60/39.3 |
| 6,727,688 B2* | 4/2004 | Slates | ............... | G01B 7/003 324/207.11 |
| 6,735,955 B2* | 5/2004 | Mannarino | ............... | F04D 27/0246 60/794 |
| 7,310,950 B2* | 12/2007 | Dovali-Solis | ............... | F02C 3/30 60/39.3 |
| 7,712,301 B1* | 5/2010 | Wagner | ............... | F01D 25/002 134/23 |
| 7,832,192 B2* | 11/2010 | Jimenez Haertel | ... | F02C 7/1435 60/39.3 |
| RE43,252 E* | 3/2012 | Ginter | ............... | F01K 21/047 60/39.26 |
| 9,739,199 B2* | 8/2017 | Kessler | ............... | F02C 7/143 |
| 9,932,856 B2* | 4/2018 | Zhang | ............... | F01D 25/12 |
| 2001/0027637 A1* | 10/2001 | Norster | ............... | F23C 7/002 60/773 |
| 2002/0073712 A1* | 6/2002 | Kopko | ............... | F01K 21/047 60/775 |
| 2002/0112465 A1* | 8/2002 | Payling | ............... | F01K 21/047 60/39.53 |
| 2004/0177618 A1 | 9/2004 | Placko et al. | | |
| 2004/0221582 A1* | 11/2004 | Howell | ............... | F23R 3/343 60/778 |
| 2005/0247066 A1* | 11/2005 | Myhre | ............... | F01D 17/02 60/803 |
| 2007/0031238 A1* | 2/2007 | Fujii | ............... | F02C 9/20 415/48 |
| 2009/0044542 A1* | 2/2009 | Thatcher | ............... | F04D 27/0207 60/773 |
| 2009/0090182 A1* | 4/2009 | Holmquist | ............ | G01M 15/14 73/455 |
| 2009/0320438 A1 | 12/2009 | Koganezawa et al. | | |
| 2010/0196137 A1* | 8/2010 | Horn | ............... | F01D 11/24 415/1 |
| 2011/0289932 A1* | 12/2011 | Thompson | ............ | F02C 3/30 60/776 |
| 2012/0023960 A1* | 2/2012 | Minto | ............... | F02C 3/34 60/772 |
| 2012/0259528 A1* | 10/2012 | Minto | ............... | F01D 17/16 701/100 |
| 2013/0028707 A1* | 1/2013 | Puerta | ............... | F02C 3/305 415/1 |
| 2013/0323012 A1* | 12/2013 | Dong | ............... | F01D 11/08 415/1 |
| 2014/0325990 A1* | 11/2014 | Takeda | ............... | F02C 9/20 60/775 |
| 2014/0369833 A1* | 12/2014 | Yu | ............... | F01D 11/14 416/1 |
| 2015/0185716 A1* | 7/2015 | Wichmann | ............ | F01K 23/101 700/287 |
| 2016/0146118 A1* | 5/2016 | Wichmann | ............... | F02C 9/50 701/100 |
| 2016/0245305 A1* | 8/2016 | Kimura | ............... | F01D 5/143 |
| 2017/0284308 A1* | 10/2017 | Myoren | ............... | F02C 3/10 |
| 2019/0024529 A1* | 1/2019 | Kajihara | ............... | F01D 17/16 |

FOREIGN PATENT DOCUMENTS

| | | | | |
|---|---|---|---|---|
| EP | 1548236 A2 * | 6/2005 | ......... | F01D 13/003 |
| JP | 63-212725 A | 9/1988 | | |
| JP | 11-72029 A | 3/1999 | | |
| JP | 2012-67764 A | 4/2012 | | |
| JP | 2012-172587 A | 9/2012 | | |

OTHER PUBLICATIONS

Japanese-language Office Action issued in counterpart Japanese Application No. 2013-237701 dated Aug. 29, 2017 (5 pages).

* cited by examiner

SYSTEM AND METHOD OF CONTROLLING A TWO-SHAFT GAS TURBINE

BACKGROUND OF THE INVENTION

1. Field of the Invention

The present invention relates to a system for and a method of controlling a two-shaft gas turbine.

2. Description of the Related Art

A two-shaft gas turbine is configured such that a high-pressure turbine driving a compressor and a low-pressure turbine driving a generator or a pump respectively have different shafts. This two-shaft gas turbine can rotate the compressor and the high-pressure turbine at high a speed even when a driven machine such as a pump and a screw compressor is rotated at a low speed. Therefore, the torque of the low-pressure turbine rotated at a low speed can be increased. For this reason, the two-shaft gas turbine is used to drive a machine such as a pump and a screw compressor. However, the two-shaft gas turbine also can be used such that the low-pressure turbine is used to drive the generator for electric power generation. When the two-shaft gas turbine is used without a speed reducer, there will be no loss resulting from the speed reducer and the compressor can be rotated at a high speed. The advantage is hence that higher efficiency can be achieved. Additionally, even when a speed reducer is used, a speed reduction ratio can be lower, which means the advantages in this case are a cost reduction and an improvement in efficiency. In the two-shaft gas turbine described above, the control system to achieve a high cycle compression ratio is disclosed JP-1988-212725-A, for example.

It is known in the art that when a gas turbine is operated at a high atmospheric temperature such as during summertime, intake air density lowers to lead to a reduction in the power output of the gas turbine. To deal with the reduction in the power output, there is a method in which, for example, droplets such as water are sprayed into the suction air of the compressor to increase the intake air density and, in addition, the intake air cooling has an effect of increasing the power output of the gas turbine. Further, when the droplets, of which the amount of spray is increased, are introduced into the compressor, the intermediate cooling has an effect of lessening the driving force for the compressor, which as a result improves the efficiency of the gas turbine. This is because the minute droplets carried into the compressor along with flowing air evaporate up to the saturation temperature of the stage while passing through the rows of rotor blades and the rows of stator vanes, and its latent heat of evaporation lowers the temperature of working fluid.

In a gas turbine (one-shaft type) provided with the output increasing mechanism by use of the water spray as described above, controlling the aperture of the inlet guide vane and the amount of spray of droplets at the intake portion of the compressor during rated operations is disclosed in JP-1999-72029-A, for example.

SUMMARY OF THE INVENTION

The normal one-shaft gas turbine is capable of increasing its power output while raising a combustion temperature with the angle of the inlet guide vane of the compressor fixed. However, the two-shaft gas turbine is configured such that the high-pressure turbine and the low-pressure turbine on the turbine side respectively have different shafts. If the combustion temperature rises with the angle of the inlet guide vane fixed, the power output of the high-pressure turbine will be greater with respect to the driving force for the compressor, so that the high-pressure turbine side will excessively be rotated. To deal with this, in the two-shaft gas turbine, the aperture of the inlet guide vane is controlled in accordance with the rise in the combustion temperature, and the suction flow rate of the compressor is controlled so as to bring a balance between the power output of the high-pressure turbine and the drive power for the compressor.

In the two-shaft gas turbine as described above, the rise in the intake air temperature during summertime will raise the driving force for the compressor. When the combustion temperature is set at a rated temperature, the inlet guide vane operates to be more closed so as to reduce the suction flow rate. In this manner, the driving force for the compressor is reduced to bring a balance with the power output of the high-pressure turbine. Therefore, a reduction in power output during summertime in the two-shaft gas turbine has a greater influence because of the addition of the reduction in suction flow rate than that in the one-shaft gas turbine. If intake air is sprayed to improve power output, the sprayed droplets will impinge on the inlet guide vanes because the inlet guide vane is closed, whereby the effect of the intermediate cooling in the compressor turns out to be smaller.

Droplets impinge on vanes to turn into coarse droplets, which then strikes the downstream rotor blades without being carried by airstreams. The coarse droplets flies to the inner wall surface of the casing by means of the centrifugal force to accumulate thereon as a liquid film. If the droplets adhere to and accumulate on the inner wall surface of the casing, a sliding loss relative to the rotation of the rotor blades could occur to increase the driving force for the compressor. Moreover, the age-related degradation of the compressor causes dust to adhere to vanes or blades, which leads to lower cascade performance. Furthermore, the compressor that sprays droplets is such that droplets adhere to the surfaces of vanes or blades; therefore, the vane or blade surfaces are likely to gather rust thereon due to corrosion. The pollution and rust on the vane or blade as mentioned above increase the roughness of the vane or blade surface to reduce the cascade performance. Thus, the lower efficiency of the compressor raises the driving force for the compressor.

The gas turbine is operated in an operation load range. For example, the gas turbine may be operated in a range from a 50%-load to a 100%-load depending on a demand for power in some cases. If the part-load operation as mentioned above is applied to the two-shaft gas turbine, the inlet guide vane is closed concurrently with the drop in the combustion temperature. Therefore, there is a concern that the efficiency of the compressor might be lower than that of the normal one-shaft gas turbine, which could lead to an increase in the driving force for the compressor.

The present invention has been made in view of the above-mentioned situations and aims to provided a two-shaft gas turbine control system and method that can increase the efficiency and reliability of the two-shaft gas turbine by controlling the amount of intake air spray and the rotational speed of a high-pressure turbine in accordance with the aperture of an inlet guide vane in a state where a two-shaft gas turbine is being operated with the compressor with reduced efficiency.

To solve the foregoing problems, an aspect of the present invention incorporates, for example, the arrangements of the appended claims. This application includes a plurality of means for solving the problems. An exemplary aspect of the present invention provides a control system for a two-shaft gas turbine, the gas turbine including: a compressor provided with an inlet guide vane at an air inlet of the compressor; a combustor for mixing compressed air compressed by the compressor with fuel for sake of combustion to generate combustion gas; a high-pressure turbine mechanically connected to the compressor and driven by the combustion gas generated by the combustor; and a low-pressure turbine driven by expanded combustion gas which has driven the high-pressure turbine. The control system includes: a droplet spray device for spraying droplets to intake air for the compressor; a tachometer for detecting a rotational speed of the high-pressure turbine; an aperture detector for detecting the aperture of the inlet guide vane; and a controller. The controller has a fuel control section for adjusting a flow rate of the fuel to be supplied to the combustor, a spray flow rate control section for adjusting a flow rate of spray water to be supplied to the droplet spray device, an inlet guide vane aperture control section for adjusting the aperture of the inlet guide vane, and an efficiency improvement control section for taking in the rotational speed of the high-pressure turbine detected by the tachometer and the aperture of the inlet guide vane detected by the aperture detector, and outputting a command signal for improving efficiency of the compressor to the fuel control section, the spray flow rate control section and the inlet guide vane aperture control section in response to the rotational speed of the high-pressure turbine and the aperture of the inlet guide vane. In response to a command from the efficiency improvement control section, the controller lowers the rotational speed of the high-pressure turbine and controls the inlet guide vane so as to be more open, thereby appropriately controlling the flow rate of the spray water.

The present invention controls the amount of intake air spray and the rotational speed of the high-pressure turbine in accordance with the aperture of the inlet guide vane in the state where the two-shaft gas turbine is being operated with its compressor reduced in efficiency. Therefore, the driving force for the compressor can be lessened and the amount of drain of the droplets in the intake portion can be reduced. Consequently, the efficiency and reliability of the two-shaft gas turbine can be increased.

DESCRIPTION OF THE PREFERRED EMBODIMENTS

Preferred embodiments of a two-shaft gas turbine control system and method according to the present invention will hereinafter be described with reference to the drawings.
[First Embodiment]

Figure 1:
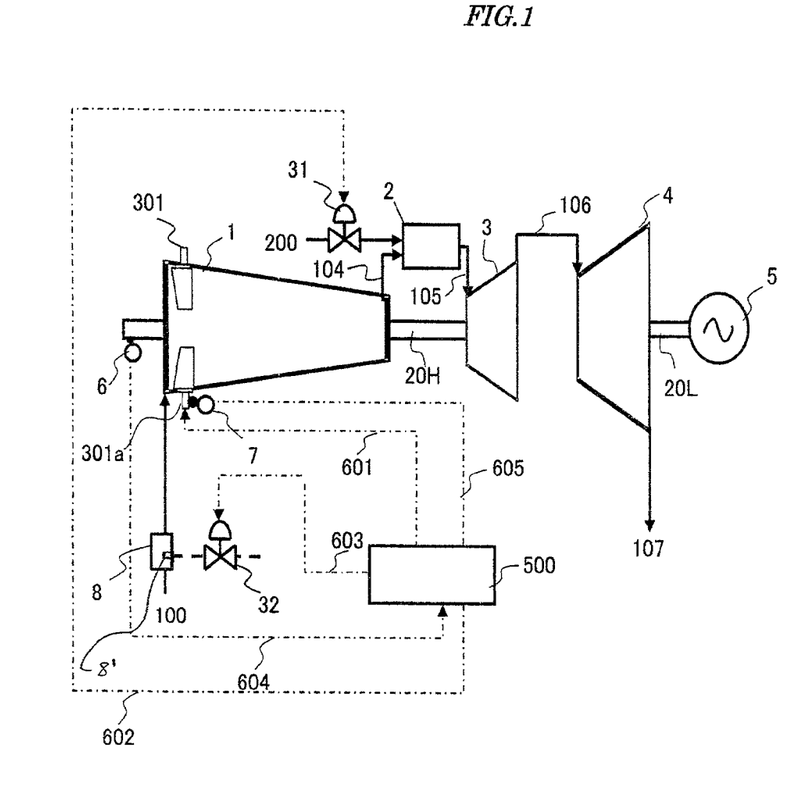
FIG. 1 is a schematic configuration diagram illustrating a two-shaft gas turbine system according to a first embodiment of a two-shaft gas turbine control system and method of the present invention.

FIG. 1 is a schematic configuration diagram illustrating a two-shaft gas turbine system according to a first embodiment of a two-shaft gas turbine control system and method of the present invention.

The two-shaft gas turbine system includes a compressor 1 for compressing air 100 sucked from the atmosphere to generate high-pressure air 104; a combustor 2 for mixing the high-pressure air 104 with fuel 200 for sake of combustion to generate high-temperature combustion gas 105; a high-pressure turbine 3 rotatably driven by the high-temperature combustion gas 105 thus generated; a low-pressure turbine 4 rotatably driven by expanded combustion gas 106 expanded in the high-pressure turbine 3 and introduced thereinto; and a generator 5 which is a load of the low-pressure turbine 4. The compressor 1 and the high pressure turbine 3 are mechanically connected by a first rotating shaft 20H. The low-pressure turbine 4 and the generator 5 are mechanically connected by use of a second rotating shaft 20L. The expanded combustion gas 106, after rotating the low-pressure turbine 4, is discharged as exhaust gas 107 to the outside of the system.

The compressor 1 is provided on its air inlet with an inlet guide vane 301 (hereinafter, also referred to as IGV) for controlling a flow rate of the intake air. The IGV 301 can be changed in the angle (IGV opening) of the vane relative to the flow direction of air by an IGV drive device 301a. The intake air flow rate of the compressor 1 is adjusted by changing the IGV opening. The IGV drive device 301a changes the IGV opening in response to a command signal 601 from a controller 500 to be described later.

The combustor 2 mixes fuel 200 supplied from a fuel supply source via a fuel control valve 31 with compressed air from the compressor 1 for the sake of combustion. The fuel control valve 31 controls the flow rate of fuel to be supplied to the combustor 2. The fuel control valve 31 changes its aperture in response to a command signal 602 from the controller 500 to be described later.

In the present embodiment, the efficiency improvement control section 25 of the controller 500 takes in the blade tip clearance detection signal 607 detected by the blade tip clearance sensor 10 and controls the amount of spray of the compressor while monitoring the tip clearance amount of the rotor blade. Specifically, the flow rate of spray water is controlled on a basis of the signal of a difference from a predetermined clearance margin. If the margin is small, the controller 500 exercises control to stop the spray. Therefore, contact between the rotor blade and the inner wall surface of the casing resulting from the reduced tip clearance of the rotor blade can be avoided reliably. Thus, the reliability of the two-shaft gas turbine can be more improved.

A tachometer 6 is provided close to the first rotating shaft 20H so as to detect the rotational speed of the first rotating shaft 20H. An aperture detector 7 is provided close to the IGV drive device 301a so as to detect the opening of the IGV 301. Incidentally, the aperture detector 7 may calculate an angle on the basis of the cylinder stroke of the IGV drive device 301a or the like for changing the opening of the IGV 301.

A rotational speed detection signal of the first rotating shaft 20H from the tachometer 6 and an aperture detection signal of the IGV 301 from the aperture detector 7 are input into the controller 500 to be described later.

Figure 2:
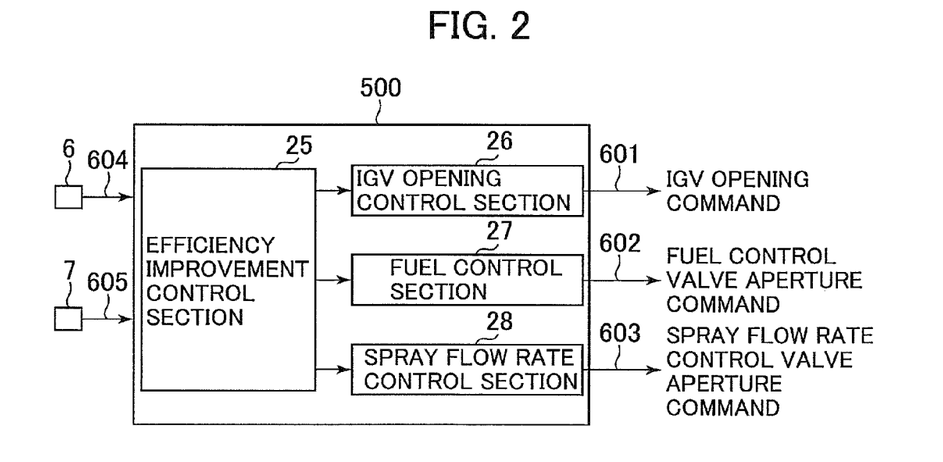
FIG. 2 is a block diagram illustrating the configuration of a controller according to the first embodiment of the two-shaft turbine control system and method of the present invention.

The control system according to the present embodiment will now be described with reference to FIG. 2. FIG. 2 is a block diagram illustrating the configuration of the controller according to the first embodiment of the two-shaft turbine control system and method of the present invention. In FIG. 2 portions attached with the same reference numerals as those in FIG. 1 are like portions; therefore, their detailed explanations are omitted.

The controller 500 includes an input section which takes in a rotational speed detection signal 604 from the tachometer 6 and an aperture detection signal 605 of the IGV 301 from the aperture detector 7; a calculation section which performs arithmetic processing described later on the basis of these detection signals; and an output section which outputs the IGV opening command 601, the fuel control valve aperture command 602, and the spray flow rate control valve aperture command 603, which are calculated by the calculation section, respectively to the IGV drive device 301a, the fuel control valve 31 and the spray flow rate control valve 32.

The calculation section includes an IGV opening control section 26, a fuel control section 27, a spray flow rate control section 28, and an efficiency improvement control section 25.

The IGV opening control section 26 calculates the IGV opening command 601 on the basis of the rotational speed detection signal 604 of the first rotating shaft 20H, so that the rotational speed of the first rotating shaft 20H will reach a predetermined rotational speed, and controls the opening of the IGV 301 through the control of the IGV drive device 301a.

On the basis of data on load status such as the detection signal of generator power output and the rotational speed detection signal 604 of the first rotating shaft 20H, the fuel control section 27 calculates the fuel control valve aperture command 602 and controls the aperture of the fuel control valve 31 so that the power output of the generator 5 may become a predetermined power output or the rotational speed of the first rotating shaft 20H may become a predetermined rotational speed. In this manner, the fuel control section 27 controls the supply of the fuel 200 to the combustor 2.

The spray flow rate control section 28 calculates the spray flow rate control valve aperture command 603 and controls the aperture of the spray flow rate control valve 32 on the basis of the rotational speed detection signal 604 of the first rotating shaft 20H and the aperture detection signal 605 of the IGV 301. In this manner, the spray flow rate control section 28 controls the amount of water sprayed to the compressor 1.

On the basis of the rotational speed detection signal 604 of the first rotating shaft 20H and the aperture detection signal 605 of the IGV 301, the efficiency improvement control section 25 calculates various command signals to bring a balance between the driving force for the compressor 1 and the power output of the high-pressure turbine 3, the signals being for improving the efficiency of the compressor. In this manner, the efficiency improvement control section 25 outputs upper command signals to the IGV opening control section 26, the fuel control section 27, and the spray flow rate control section 28.

Figure 3:
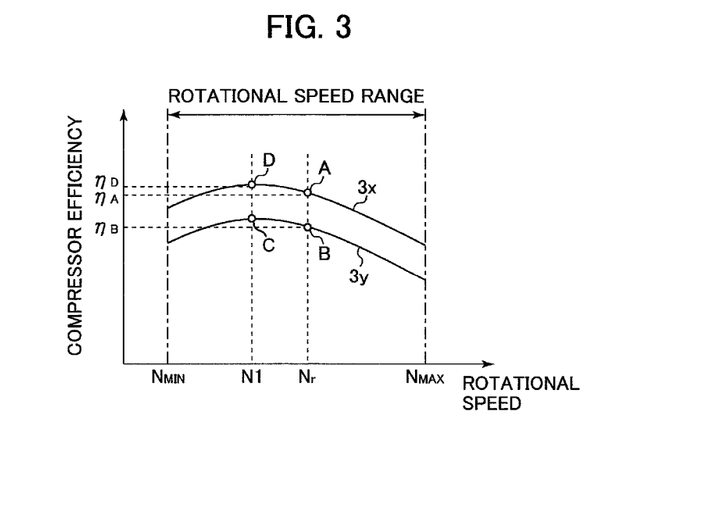
FIG. 3 is a characteristic diagram showing the relation between rotational speed and compressor efficiency in the first embodiment of the two-shaft gas turbine control system and method according to the present invention.
Figure 4:
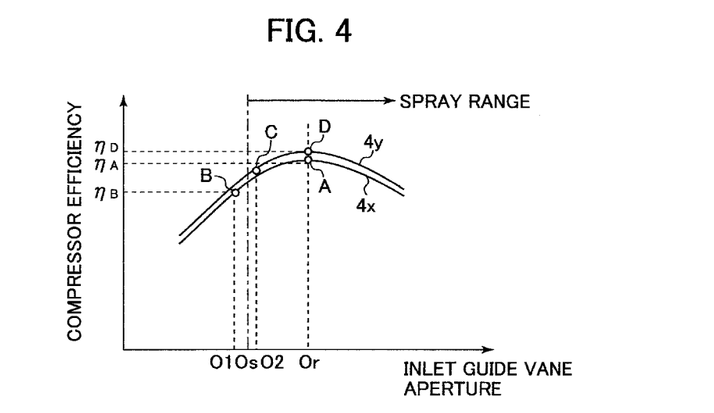
FIG. 4 is a characteristic diagram showing the relation between an IGV opening and compressor efficiency in the first embodiment of the two-shaft gas turbine control system and method according to the present invention.

The operation of the two-shaft gas turbine system according to the present embodiment will now be briefly described with reference to FIGS. 3 and 4. FIG. 3 is a characteristic diagram showing the relation between the rotational speed and the compressor efficiency in the first embodiment of the two-shaft gas turbine control system and method according to the present invention. FIG. 4 is a characteristic diagram showing the relation between the IGV opening and the compressor efficiency in the first embodiment of the two-shaft gas turbine control system and method according to the present invention.

A description is first given of the characteristic diagrams. In FIGS. 3 and 4, the vertical axis represents compressor efficiency. The horizontal axis in FIG. 3 represents the rotational speed of the high-pressure turbine and the horizontal axis in FIG. 4 represents the opening of the IGV 301.

FIG. 3 shows the distribution of the compressor efficiency relative to the rotational speed of the high-pressure turbine. In FIG. 3, symbol Nr on the horizontal axis denotes a rated rotational speed, $N_{MIN}$ denotes an operation allowable minimum rotational speed, and $N_{MAX}$ denotes an operation allowable maximum rotational speed. The portion between $N_{MIN}$ and $N_{MAX}$ denotes a range of rotational speeds at which operation is possible. This range of the rotational speed is set to avoid shaft vibration and blade resonance in the gas turbine. In FIG. 3, a characteristic line 3x denotes a compressor efficiency relative to the rotational speed encountered when the IGV opening described later is a rated aperture Or. In addition, a characteristic line 3y denotes a compressor efficiency relative to the rotational speed encountered when the IGV opening is O1.

As these characteristic lines 3x, 3y show, an axial compressor is such that as the rotational speed exceeds the rated rotational speed, circumferential velocity increases. Therefore, the compressor efficiency is reduced due to the influence of a shock wave loss occurring on a blade/vane surface. Meanwhile, with the stall margin of a cascade taken into account, the compressor is designed such that the point of maximum efficiency exists at rotational speed which is lower than a rated rotational speed. The efficiency decreases at this rotational speed which is lower than the maximum efficiency point.

FIG. 4 shows the distribution of the compressor efficiency relative to the aperture of the inlet guide vane (IGV). In FIG. 4, symbol Or on the horizontal axis denotes a rated IGV opening and Os denotes the IGV opening at which intake air spray can reduce the amount of drain. In FIG. 4, a characteristic line 4x denotes a compressor efficiency relative to the IGV opening encountered when the rotational speed of the high-pressure turbine 3 is equal to a rated rotational speed Nr. A characteristic line 4y denotes a compressor efficiency encountered when the rotational speed of the high-pressure turbine 3 is N1.

As these characteristic lines 4x, 4y show, if intake air is sprayed at an aperture smaller than the IGV opening Os (sprayed in the state where the IGV is closed), droplets impinging on the IGV 301 increase so as to develop drain and to reduce the effect of intermediate cooling. In addition, the collision of the droplets generates coarse droplets, which turn into a liquid film on the inner wall surface of the casing. This liquid film immediately cools the casing to reduce a blade tip clearance described later. Thus, there is a great possibility that rubbing could occur in which the inner wall surface of the casing and the blade tip come into contact with each other. In other words, if the IGV opening is not lower than Os, it is preferable that intake air be sprayed in the light of reliability. As shown in FIGS. 3 and 4, a decrease in the compressor efficiency relative to the variation of the IGV opening is greater than a decrease in the compressor efficiency relative to the rotational speed. Therefore, the influence of the decline in the compressor efficiency resulting from the closing of the IGV 301 due to the increased atmospheric temperature is will be greater.

A description is next given of the operation of the two-shaft gas turbine. A point at which the two-shaft gas turbine is operated in the normal condition is denoted by symbol A in FIGS. 3 and 4. This operation point A means the high-pressure turbine 3 is being operated at a rated rotational speed Nr, the opening of the IGV 301 is being a rated aperture Or, and intake air is not being sprayed. Compression efficiency at this time is $\eta_A$.

An operation point B shows the case where for example, because of increased atmospheric temperature, the IGV opening is shifted to symbol O1 shown in FIG. 4; that is, the IGV is closed at this point. In this case, the characteristic line is shifted from 3x to 3y as shown in FIG. 3; however, the rotational speed of the high-pressure turbine remains unchanged at Nr. As shown in FIGS. 3 and 4, since the opening of the IGV 301 is reduced, the compressor efficiency decreases to $\eta_B$.

To improve the efficiency of the compressor 1, the controller 500 controls a fuel flow rate signal to lower the rotational speed of the high-pressure turbine 3 to N1. In this case, as the rotational speed signal of the high-pressure turbine is lowered, a command signal to increase the opening of the IGV 301 is output to the IGV 301. Therefore, the opening of the IGV 301 is increased from O1 to O2. In this case, the characteristic line is shifted from 4x to 4y as shown in FIG. 4. As a result of the increased opening of the IGV 301, the compressor efficiency slightly rises to $\eta_C$.

As shown in FIG. 4, the aperture O2 of the IGV 301 is greater than the IGV opening Os at which the above-mentioned intake air spray can reduce the amount of drain. The controller 500 then starts the intake air spray. Since the opening of the IGV 301 is ensured, the intake air spray effectively promotes the evaporation of droplets inside the compressor 1. The intermediate cooling has an effect of lessening the driving force for the compressor 1 and further improve the opening of the IGV in the opening direction. As a result, the IGV 301 is operatively opened to the rated aperture Or and an operation point D is reached at which intake air is sprayed and the high-pressure turbine is operated at the rotational speed N1. At this time, the compressor efficiency is $\eta_D$.

Figure 5:
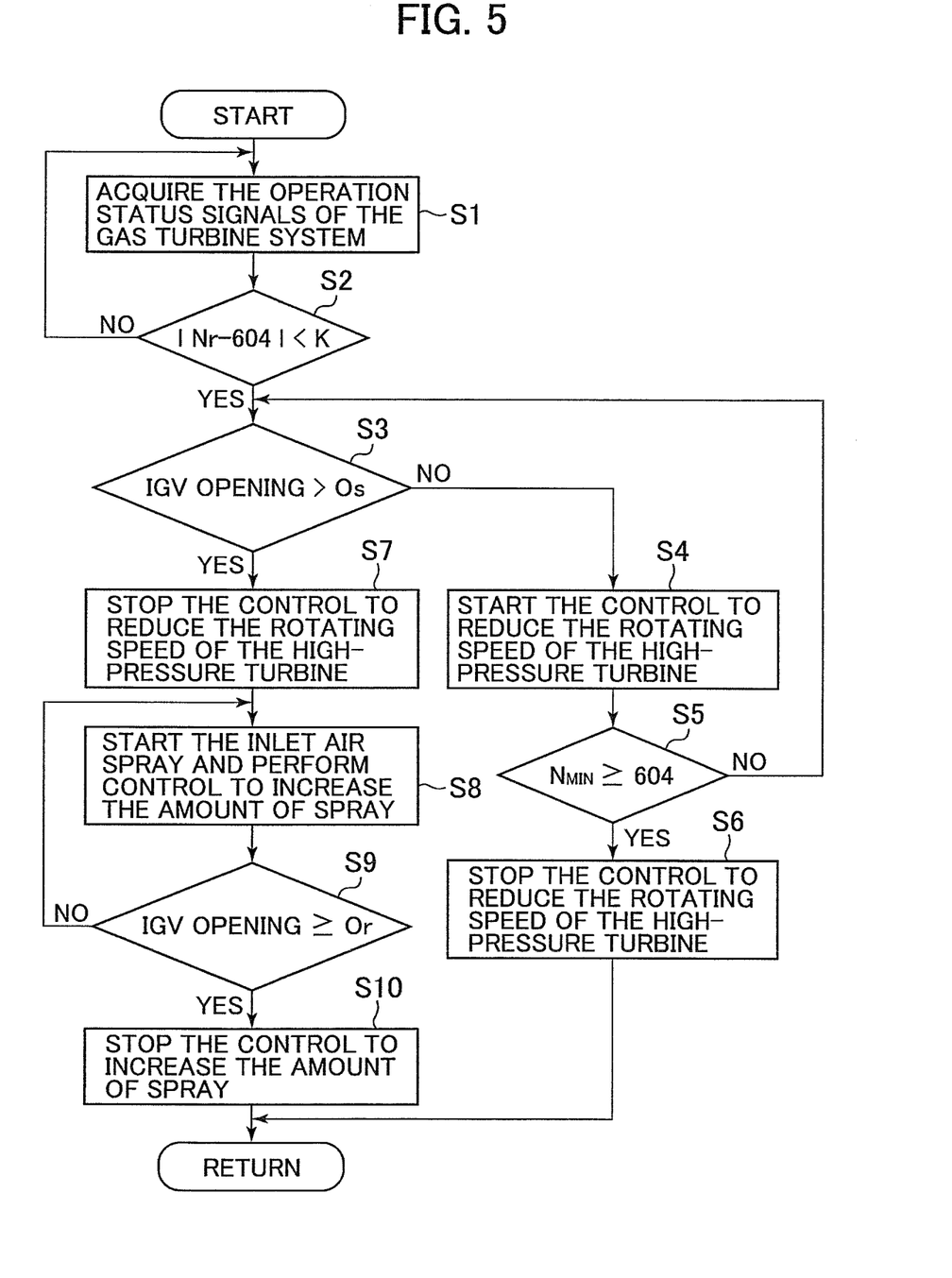
FIG. 5 is a flowchart illustrating the details of processing of the controller according to the first embodiment of the two-shaft gas turbine control system and method of the present invention.

A description is next given of the details of processing of the controller according to the present embodiment with reference FIG. 5. FIG. 5 is a flowchart illustrating the details of processing of the controller according to the first embodiment of the two-shaft gas turbine control system and method of the present invention. In FIG. 5, portions attached with the same reference numerals as those in FIGS. 1 to 4 are like portions and their detailed explanations are thus omitted.

The controller 500 obtains the operation state signals of the gas turbine system (step S1). Specifically, the efficiency improvement control section 25 obtains a rotational speed detection signal 604 of the first rotating shaft 20H (the rotational speed of the high-pressure turbine 3) from the tachometer 6 and an aperture detection signal 605 of the IGV 301 from the aperture detector 7.

The controller 500 determines whether the rotational speed 604 of the high-pressure turbine 3 is close to the rated rotational speed (step S2). Specifically, the efficiency improvement control section 25 compares the preset rated rotational speed Nr with the rotational speed detection signal 604 and determines whether a difference therebetween is smaller than or equal to a predetermined value K. If the difference between the rotational speed detection signal 604 and the rated rotational speed Nr is smaller than or equal to the predetermined value K, the processing proceeds to step S3 or otherwise returns to step S1.

The controller 500 determines whether the opening of the IGV 301 exceeds the IGV opening Os at which the intake air spray can reduce the amount of drain (step S3). Specifically, the efficiency improvement control section 25, after comparing the aperture detection signal 605 of the IGV 301 with the IGV opening Os at which the preset intake air spray can reduce the amount of drain, determines whether the aperture detection signal 605 of the IGV 301 exceeds the IGV opening Os. If the aperture detection signal 605 of the IGV 301 does not exceed the IGV opening Os, the processing proceeds to step S4 or otherwise proceeds to step S7.

The controller 500 starts control to reduce the rotational speed of the high-pressure turbine 3 (step S4). Specifically, the efficiency improvement control section 25 outputs an upper command signal to lower the amount of fuel supply to the fuel control section 27 in order to reduce the rotational speed of the high-pressure turbine 3. In this manner, the fuel control valve aperture command 602 to be output from the fuel control section 27 orders to start reducing the aperture of the fuel control valve. The flow so far corresponds to a portion from the operation point B described with FIGS. 3 and 4 to the rotational speed of the high-pressure turbine 3 being reduced.

The controller 500 determines whether the rotational speed 604 of the high-pressure turbine 3 is greater than or equal to the operation allowable minimum rotational speed $N_{MIN}$ (step S5). Specifically, the efficiency improvement control section 25, after comparing the preset operation allowable minimum rotational speed $N_{MIN}$ with the rotational speed detection signal 604, determines whether the rotational speed detection signal 604 is lower than or equal to the operation allowable minimum rotational speed $N_{MIN}$. If the rotational speed detection signal 604 is greater than the operation allowable minimum rotational speed $N_{MIN}$, the processing returns to step S3 or otherwise proceeds to step S6.

In step S5, if the rotational speed detection signal 604 is not greater than the operation allowable minimum rotational speed $N_{MIN}$, the controller 500 stops the control to reduce the rotational speed of the high-pressure turbine 3 (step S6). Specifically, the efficiency improvement control section 25 stops the upper command signal that have been output to the fuel control section 27 to lower the amount of fuel supply, in order to reduce the rotational speed of the high-pressure turbine 3. In this manner, the fuel control valve aperture command 602 to be output from the fuel control section 27 orders to stop reducing the aperture of the fuel control valve. This is because it is predicted that the operation at the operation allowable minimum rotational speed $N_{MIN}$ or lower leads to the occurrence of the shaft vibration and blade resonance of the gas turbine. If the processing at step S6 is completed, it proceeds to the return and is started again.

In step S5, if the rotational speed detection signal 604 is higher than the operation allowable minimum rotational speed $N_{MIN}$, the controller 500 executes step S3 again.

In step S3, if the aperture detection signal 605 of the IGV 301 exceeds the IGV opening Os, the controller 500 stops the control to reduce the rotational speed of the high-pressure turbine 3 (step S7). Specifically, the efficiency improvement control section 25 stops the upper command signal, which has been output to the fuel control section 27, to reduce the amount of fuel supply, in order to reduce the rotational speed of the high-pressure turbine 3. In this manner, the fuel control valve aperture signal output from the fuel control section 27 orders to stop reducing the aperture of the fuel control valve. The flow so far corresponds to a portion shifted from the operation point B to the operation point C described with FIGS. 3 and 4.

The controller 500 starts the intake air spray and the control to increase the amount of spray (step S8). Specifically, the efficiency improvement control section 25 outputs an upper command signal to increase the flow rate of spray to the spray flow rate control section 28 in order to increase the opening of the IGV 301. In this manner, the spray flow rate control valve command 603 output from the spray flow rate control section 28 orders to start increasing the flow rate of spray. The flow so far corresponds to a portion from the operation point C described with FIGS. 3 and 4 to the amount of spray being increased.

The controller 500 determines whether the opening of the IGV 301 is not lower than the rated aperture Or (step S9). Specifically, the efficiency improvement control section 25 compares the preset IGV rated aperture Or with the aperture detection signal 605 of the IGV 301 and determines whether the aperture detection signal 605 of the IGV 301 is not lower than the IGV rated aperture Or. If the aperture detection signal 605 of the IGV 301 is lower than the IGV rated aperture Or, the processing returns to step S8 or otherwise the processing proceeds to step S10. The flow so far corresponds to a portion from the operation point C to the operation point D described with FIGS. 3 and 4. Since the opening of the IGV 301 is ensured, the intake air spray here promotes the evaporation of droplets inside the compressor 1 effectively. The intermediate cooling has an effect of lessening the driving force for the compressor 1 and further improving the opening of the IGV in the opening direction.

In step S9, if the aperture detection signal 605 of the IGV 301 is lower than the IGV rated aperture Or, the controller 500 executes step S8 again.

In step S9, if the aperture detection signal 605 of the IGV 301 is not lower than the IGV rated aperture Or, the controller 500 stops the control to increase the amount of spray (step S10). Specifically, the efficiency improvement control section 25 stops the upper command signal to increase the amount of spray output to the spray flow rate control section 28 in order to improve the opening of the IGV 301 in the opening direction. In this manner, the spray flow rate control valve aperture command 603 output from the spray flow rate control section 28 orders to stop increasing the aperture of the spray flow control valve. That is to say, a fixed flow rate of spray is supplied. The flow so far corresponds to a portion shifted from the operation point C to the operation point D described with FIGS. 3 and 4. After the processing in step S10 is completed, the processing proceeds to the return and is started again.

According to the first embodiment of the two-shaft gas turbine control system and method of the present invention described above, in the state where the two-shaft gas turbine is being operated at the reduced efficiency of the compressor 1 thereof, the amount of intake air spray and the rotational speed of the high-pressure turbine 3 are controlled in accordance with the opening of the IGV 301 (the inlet guide vane). Therefore, the driving force for the compressor 1 can be lessened while, at the same time, the amount of drain of the droplets in the intake portion can be reduced. As a result, the efficiency and reliability of the two-shaft gas turbine can be enhanced.

[Second Embodiment]

Figure 6:
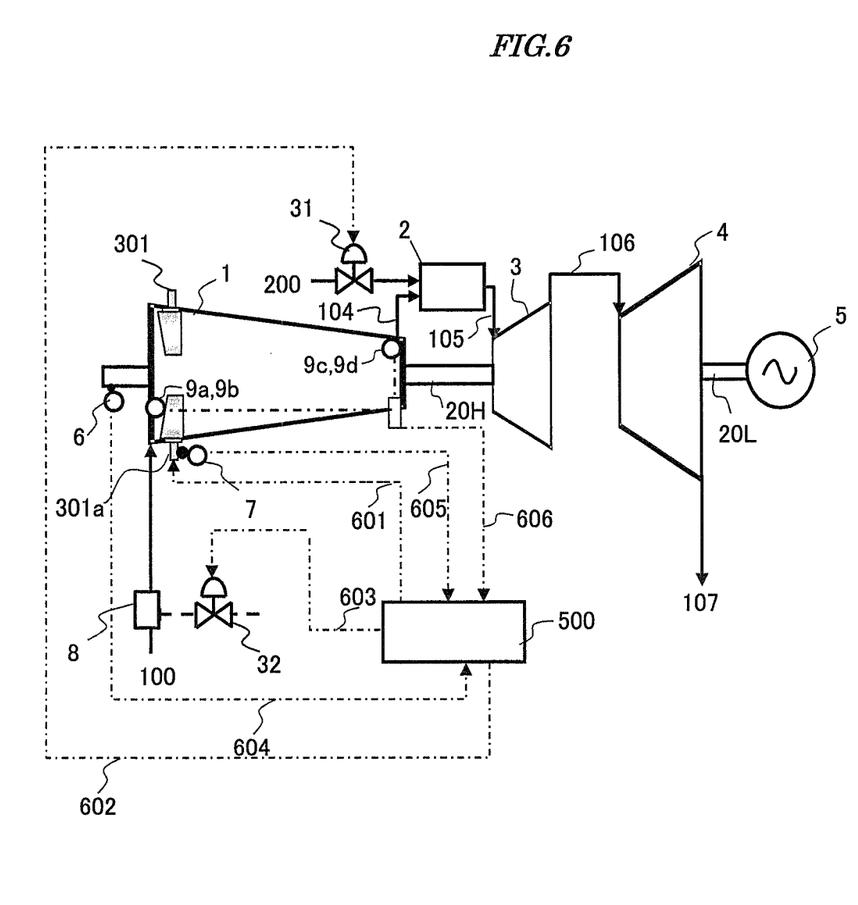
FIG. 6 is a schematic configuration diagram illustrating a two-shaft gas turbine system according to a second embodiment of a two-shaft gas turbine control system and method of the present invention.

A second embodiment of a two-shaft gas turbine control system and method according to the present invention will hereinafter be described with reference to the drawings. FIG. 6 is a schematic configuration diagram illustrating a two-shaft gas turbine system according to the second embodiment of the two-shaft gas turbine control system and method of the present invention. In FIG. 6, portions attached with the same reference numerals as those in FIGS. 1 to 5 are like portions and their detailed explanation are thus omitted.

The second embodiment of the two-shaft gas turbine control system and method according to the present invention illustrated in FIG. 6 is configured to have almost the same devices as those of the first embodiment. However, the second embodiment is different from the first embodiment in the following configuration. The present embodiment includes a first thermometer 9a for detecting the intake air temperature of the compressor 1, a first pressure gauge 9b for detecting the intake air pressure of the compressor 1, a second thermometer 9c for detecting the discharge temperature of the compressor 1, and a second pressure gauge 9d for detecting the discharge pressure of the compressor 1. The various detection signals 606 detected by the associated thermometers 9a, 9c and pressure gauges 9b, 9d are taken in by the controller 500.

A droplet spray device 8 is provided on the air inlet of the compressor 1 which corresponds to the upstream side of the IGV 301. The droplet spray device 8 is adapted to allow a high pressure nozzle 8' installed therein to pressurize water supplied via a droplet flow rate control valve 32 and spray the pressurized water toward an air intake duct and the compressor 1. The droplet flow rate control valve 32 controls the flow rate of water to be supplied to the droplet spray device 8. In addition, the droplet flow rate control valve 32 changes its aperture in response to a command signal 603 from the controller 500 described later.

Water atomized by the high pressure nozzle 8' of the droplet spray device 8 evaporates in the air intake duct and inside the compressor 1 to cool the intake air through the latent heat of evaporation. An increase in the air density resulting from the cooling of the intake air leads to an increase in the mass flow rate of air passing through the compressor 1. Since moisture contained in intake air evaporates in the compressor 1, the temperature of air passing through the compressor 1 lowers. Consequently, the power necessary for the compressor 1 to work drops, whereby the efficiency of the two-shaft gas turbine system improves.

The second embodiment of the two-shaft gas turbine control system and method according to the present invention described above can produce the same effects as those of the first embodiment.

According to the second embodiment of the two-shaft gas turbine of the present embodiment described above, the compressor efficiency is directly calculated and the rotational speed of the high-pressure turbine and the spray amount of the compressor 1 are controlled on the basis of the signal of the compressor efficiency. Thus, the accuracy of the operation control of the two-shaft gas turbine is improved to result in higher reliability.

[Third Embodiment]

Figure 7:
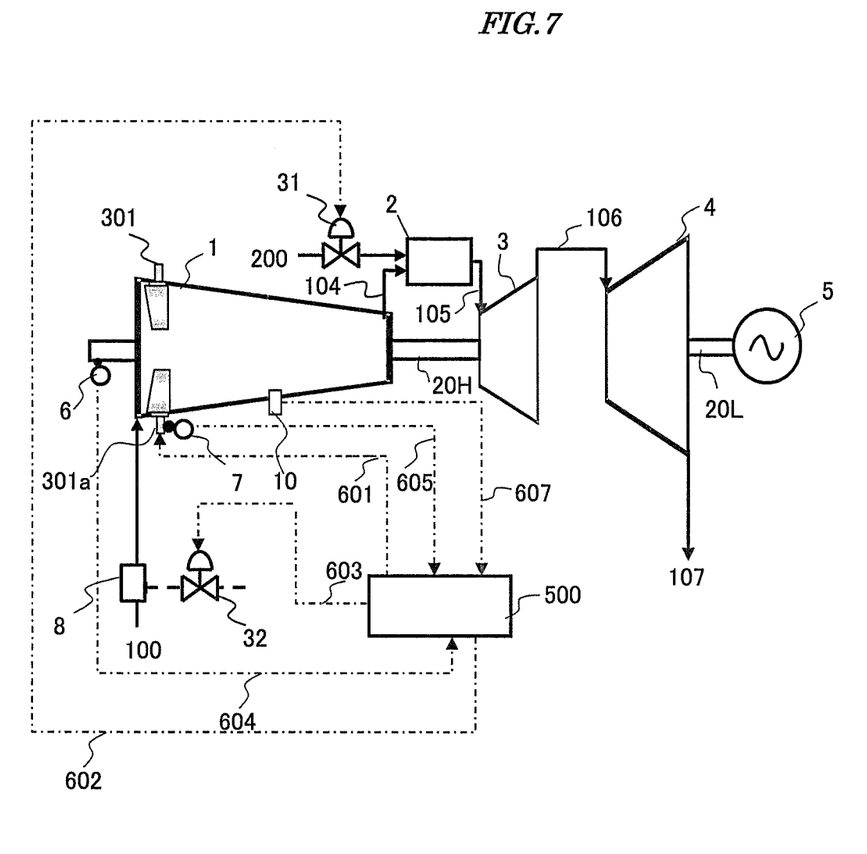
FIG. 7 is a schematic configuration diagram illustrating a two-shaft gas turbine system according to a third embodiment of a two-shaft gas turbine control system and method according to the present invention.

A third embodiment of a two-shaft gas turbine control system and method according to the present invention will hereinafter be described with reference to the drawings. FIG. 7 is a schematic configuration diagram illustrating a two-shaft gas turbine system according to the third embodiment of the two-shaft gas turbine control system and method of the present invention. In FIG. 7, portions attached with the same reference numerals as those in FIGS. 1 to 4 are like portions and their detailed explanations are thus omitted.

The third embodiment of the two-shaft gas turbine control system and method according to the present invention illustrated in FIG. 7 is configured to have almost the same devices as those of the first embodiment. However, the third embodiment is different from the first embodiment in the following configuration. In the present embodiment, a blade tip clearance sensor 10 for measuring a tip clearance is provided at an intermediate stage of the compressor. A blade tip clearance detection signal 607 detected by the blade tip clearance sensor 10 is taken in by the controller 500.

In the compressor 1 in which a quantity of droplets are sprayed to the intake air of the gas turbine, droplets impinge on the IGV 301 to turn into coarse droplets, which form a liquid film on the inner wall surface of the casing from the front stages to the intermediate stages. The temperature of the mainstream air is gradually increased from the atmospheric temperature along with the flow. Therefore, the liquid film accumulating on the front stages exerts almost no influence on the thermal deformation of the casing. However, droplets adhere to the inner wall surface of the casing with high temperature in an intermediate stages located on the upstream side of a stage in which evaporation of the droplets is completed. Therefore, such adhering droplets exert a great influence on the thermal deformation of the casing.

A description is given of a case where droplets are sprayed in the state in which a fixed clearance exists between a tip portion of a rotor blade in the intermediate stage and the inner wall surface of the annular casing at the time of rated operation before the droplets will be sprayed. If droplets accumulate to form a liquid film on the casing of the intermediate stage, the temperature of the casing lowers due to heat transfer to restrain the thermal expansion of the casing. The thermal expansion of the rotor or the rotor blade becomes smaller than that of the casing to reduce the clearance between the rotor blade and the inner wall surface of the casing. The thermal expansion of the casing then becomes too small. There is a possibility that the rotor blade may come into contact with the inner wall surface of the casing to end up being damaged at its tip.

If the large tip clearance of the rotor blade is designed with the spray of droplets taken into account, droplets are sprayed at the time of high atmospheric temperatures to restrain the thermal deformation of the casing, thereby making it possible to minimize the blade tip clearance. However, at the time of low atmospheric temperature, the spray of droplets is adjusted to a low flow rate or is stopped. Therefore, the enlargement of the blade tip clearance lowers the efficiency of the compressor 1. The amount of spray in the air intake duct varies depending on the intake air temperature and humidity conditions of the compressor 1. Therefore, the position of evaporation inside the compressor 1 varies as well. In other words, a stage at which evaporation completes is varied due to the atmospheric conditions and the amount of spray. It is difficult to accurately set the tip clearance of the rotor blade at the time of designing.

In the present embodiment, the controller 500 takes in the blade tip clearance detection signal 607 detected by the blade tip clearance sensor 10 and controls the amount of spray of the compressor while monitoring the tip clearance amount of the rotor blade. Specifically, the flow rate of spray water is controlled on a basis of the signal of a difference from a predetermined clearance margin. If the margin is small, the controller 500 exercises control to stop the spray. Therefore, contact between the rotor blade and the inner wall surface of the casing resulting from the reduced tip clearance of the rotor blade can be avoided reliably. Thus, the reliability of the two-shaft gas turbine can be more improved.

The third embodiment of the two-shaft gas turbine control system and method according to the present invention can produce the same advantages as those of the first embodiment.

According to the third embodiment of the two-shaft gas turbine control system and method of the present invention described above, the two-shaft gas turbine can be provided that can effectively lessen the driving force for the compressor resulting from the droplet spray in order to deal with the reduced efficiency of the axial compressor 1 of the two-shaft gas turbine, reduce the amount of drain of droplets in the air inlet, and avoid the contact between the rotor blade and the inner wall surface of the casing resulting from the narrowed blade tip clearance of the compressor, thereby increasing the power output thereof and providing superior reliability.

The invention is not limited to the above embodiments disclosed, but allows various modifications. The foregoing embodiments are only meant to be illustrative, and the invention is not necessarily limited to structures having all the components disclosed. Also, all the embodiments described above can be applied to one and the same gas turbine system.

What is claimed is:

1. A control system for a two-shaft gas turbine, the two-shaft gas turbine comprising:
    a compressor provided with an inlet guide vane at an air inlet of the compressor;
    a combustor configured to mix compressed air compressed by the compressor with fuel for sake of combustion to generate combustion gas;
    a high-pressure turbine mechanically connected to the compressor and driven by the combustion gas generated by the combustor; and
    a low-pressure turbine driven by expanded combustion gas resulting from action of the high-pressure turbine driven by the combustion gas;
    a high pressure nozzle configured to spray droplets to intake air for the compressor; and
    the control system comprising:
    a tachometer configured to detect a rotational speed of the high-pressure turbine;
    an aperture detector configured to detect an aperture of the inlet guide vane; and
    a controller that is configured to take in the rotational speed of the high-pressure turbine detected by the tachometer and the aperture of the inlet guide vane detected by the aperture detector,
    wherein when the rotational speed of the high-pressure turbine detected by the tachometer is a rated rotational speed or a fraction of the rated rotational speed and the aperture of the inlet guide vane detected by the aperture detector is less than a specified value, the controller
        lowers the rotational speed of the high-pressure turbine while controlling the inlet guide vane so as to be more open,
        monitors the aperture of the inlet guide vane along with the reduction in the rotational speed of the high-pressure turbine,
        stops the reduction in the rotational speed of the high-pressure turbine and starts intake air spray of the high pressure nozzle when the aperture of the inlet guide vane exceeds the specified value.

2. A control system for a two-shaft gas turbine, the two-shaft gas turbine comprising:
a compressor provided with an inlet guide vane at an air inlet of the compressor;
a combustor configured to mix compressed air compressed by the compressor with fuel for sake of combustion to generate combustion gas;
a high-pressure turbine mechanically connected to the compressor and driven by the combustion gas generated by the combustor; and
a low-pressure turbine driven by expanded combustion gas resulting from action of the high-pressure turbine driven by the combustion gas;
a high pressure nozzle configured to spray droplets to intake air for the compressor; and
the control system comprising:
a tachometer configured to detect a rotational speed of the high-pressure turbine;
an aperture detector configured to detect an aperture of the inlet guide vane; and
a controller that is configured to
adjust a flow rate of the fuel to be supplied to the combustor,
adjust a flow rate of spray water to be supplied to the high pressure nozzle,
adjust the aperture of the inlet guide vane, and
take in the rotational speed of the high-pressure turbine detected by the tachometer and the aperture of the inlet guide vane detected by the aperture detector,
wherein when the rotational speed of the high-pressure turbine detected by the tachometer is a rated rotational speed or a fraction of the rated rotational speed and the aperture of the inlet guide vane detected by the aperture detector is less than a specified value, the controller
lowers the rotational speed of the high-pressure turbine while controlling the inlet guide vane so as to be more open,
monitors the aperture of the inlet guide vane along with the reduction in the rotational speed of the high-pressure turbine,
stops the reduction in the rotational speed of the high-pressure turbine and starts intake air spray of the high pressure nozzle when the aperture of the inlet guide vane exceeds the specified value.

3. The control system according to claim 1, further comprising:

a clearance sensor configured to measure a tip clearance of a rotor blade at an intermediate stage of the compressor, wherein
the controller receives a tip clearance of the rotor blade detected by the clearance sensor, and
stops the intake air spray when a difference from a preset clearance margin is less than a predetermined value.

4. A method for controlling a two-shaft gas turbine, the method comprising:
adjusting a flow rate of the fuel to be supplied to a combustor of the two-shaft gas turbine, the two-shaft gas turbine including a compressor provided with an inlet guide vane at an air inlet of the compressor, a combustor configured to mix compressed air compressed by the compressor with fuel for sake of combustion to generate combustion gas, a high-pressure turbine mechanically connected to the compressor and driven by the combustion gas generated by the combustor, a low-pressure turbine driven by expanded combustion gas resulting from action of the high-pressure turbine driven by the combustion gas, a high pressure nozzle configured to spray droplets to intake air for the compressor, a tachometer configured to detect a rotational speed of the high-pressure turbine, an aperture detector configured to detect an aperture of the inlet guide vane, and a controller;
adjusting a flow rate of spray water to be supplied to the high pressure nozzle;
adjusting the aperture of the inlet guide vane; and
taking in the rotational speed of the high-pressure turbine detected by the tachometer and the aperture of the inlet guide vane detected by the aperture detector, wherein
when the rotational speed of the high-pressure turbine detected by the tachometer is a rated rotational speed or a fraction of the rated rotational speed and the aperture of the inlet guide vane detected by the aperture detector is less than a specified value, the controller
lowers the rotational speed of the high-pressure turbine while controlling the inlet guide vane so as to be more open,
monitors the aperture of the inlet guide vane along with the reduction in the rotational speed of the high-pressure turbine, and
stops the reduction in the rotational speed of the high-pressure turbine and starts intake air spray of the high pressure nozzle when the aperture of the inlet guide vane exceeds the specified value.

* * * * *